United States Patent [19]

Li

[11] Patent Number: 4,846,293
[45] Date of Patent: Jul. 11, 1989

[54] HUMIDITY CONTROL SYSTEM FOR A SCALE

[75] Inventor: Da K. Li, Acton, Mass.

[73] Assignee: Setra Systems, Inc., Acton, Mass.

[21] Appl. No.: 256,493

[22] Filed: Oct. 12, 1988

[51] Int. Cl.$^4$ .................... G01G 3/14; G01G 21/28
[52] U.S. Cl. ........................... 177/210 C; 177/180
[58] Field of Search ............... 177/210 C, 180, 238; 73/862.68

[56] References Cited

U.S. PATENT DOCUMENTS

| | | | |
|---|---|---|---|
| 4,416,343 | 11/1983 | Knothe et al. | 177/180 |
| 4,448,085 | 5/1984 | Lee | 177/210 C X |
| 4,548,288 | 10/1985 | Komoto | 177/180 |
| 4,666,007 | 5/1987 | Knothe et al. | 177/180 X |
| 4,754,653 | 7/1988 | Hafner et al. | 73/862.68 |

Primary Examiner—George H. Miller, Jr.
Attorney, Agent, or Firm—Wolf, Greenfield & Sacks

[57] ABSTRACT

Variations in the relative humidity of the air present within a housing of a scale, particularly a high accuracy scale utilizing a capacitive transducer mounted at the interior of the housing, are controlled by a combination of (i) a mechanical partial seal of the housing which resists a flow of moisture (by diffusion and air flow) through the seal, and (ii) a supply of a desiccant located within the housing which both absorbs and desorbs moisture from the air held within the housing. The partial seal is preferably located at an opening in the housing for a shaft mounting a weighing pan external to the housing. For low motion, a face seal of a few mils provides the appropriate flow resistance. For high motion or low capacity scales, the partial seal is a radial seal formed by the shaft and a surrounding sleeve mounted with a small annular clearance is used. The desiccant is preferbly silica gel. The values for the flow resistance and desiccant supply for a given interior volume produce a very slow change in the relative humidity in the housing over time, typically several years. In use, the relative humidity within the housing varies within ±5% of a steady state value despite much larger variations in the temperature and humidity of the ambient air surrounding the housing.

9 Claims, 5 Drawing Sheets

HUMIDITY CONTROL SYSTEM FOR A SCALE

BACKGROUND OF THE INVENTION

This invention relates in general to weighing systems. More specifically, it relates to an apparatus and method for controlling the humidity within the scale.

Changes in the humidity of the air present within a scale can cause changes in the output of the scale which result in inaccurate measurements of weight, mass, or count. This is a particularly troublesome problem for scales which use a variable capacitance transducer to convert an applied force to-be-measured into an electrical output signal. Force transducers of this type are described in U.S. Pat. Nos. 4,485,085; 4,558,600; and 4,463,614, commonly assigned with this application. A weighing system utilizing such a transducer is described in U.S. Pat. Nos. 4,382,479 and 4,513,831, also commonly assigned with the present application. Humidity variations are a problem because they change the dielectric constant of the air in the variable capacitance gap, which in turn directly changes the output signal in a way that does not correspond to the applied force. Humidity is also a problem in that it can lead to condensation on the capacitor electrodes, and it can alter the performance of an inductance coil and other circuit elements present in the scale. While a straightforward solution might appear to be to simply seal the interior of the scale, this is not a practical solution. One problem is that a pan or some equivalent structure located exterior to the scale housing must be mechanically connected to the interior to transmit the force produced by the object being weighed as it rests on the pan to the transducer. Typically, a rigid shaft transmits the force and it enters the housing through a hole. If the shaft-to-housing clearance is sealed, this will produce a resistance to a longitudinal motion of the shaft which introduces an error in the output signal. Therefore, ambient air, with its variations in humidity, enters the interior cavity of the scale. One known solution is to hermetically seal the humidity-sensitive elements in a bellows, typically one made of rubber or metal. This solution does isolate components from certain atmospheric changes, but changes in the barometric pressure produce varying forces on the bellows which can result in output signal errors. Rubber bellows "boots" also have material-related problems such as a high hysteresis, creep, difficulty in achieving a reliable seal, and aging. Another known approach is to measure the humidity within the interior scale cavity independently, and use this measurement to produce electronically a compensating signal to offset the humidity changes. This approach has several significant drawbacks. First, it is difficult to measure only the relative humidity. Most units are influenced by temperature variations and air flow, and it does not respond well at very low and very high relative humidity condition. Second, there is the additional cost and reliability problems associated with this additional sensor and its related electronics.

Another approach has used a cooler positioned within the housing to condense the water vapor selectively on its condensing surfaces. This solution has a disadvantage in that it requires a relatively long period of time--hours, or in some cases, as much as a day--to achieve a steady state humidity. However, even this steady state is not a reliably controlled condition. Sudden or large variations in the ambient air humidity ca introduce unacceptably large variations in the humidity internal to the scale.

Still another known solution, disclosed in U.S. Pat. No. 4,649,759, also commonly assigned with the present application, is to use a second reference, or "dummy", capacitor mounted on or near the variable gap transducer. This second capacitor has a fixed gap so that by monitoring changes in its capacitance one can measure the atmospheric changes and compensate for them. While this arrangement works well under 0% to 80% R.H. (but not over 80% R.H.), it is restricted for various practical reasons to circuitry which produces a voltage or current signal output, but not a frequency signal output.

It is also significant to note that in the prior art, humidity control has often not been a significant problem in scale design because the element that converted the applied force into an output signal was usually a strain gauge, mechanical spring system, or some other element that is substantially insensitive to humidity (if the relative humidity is less than 80%). Also, with prior art scales, including those operating on the variable capacitance principle, it has usually been necessary to recalibrate the scale frequently. Some laboratory scales recommend recalibration every day, but all known high accuracy scales require recalibration at periodic intervals shorter than six months.

It is therefore a principal object of the present invention to provide a humidity control system for a scale that reliably controls the humidity in the scale housing at a generally constant value, despite much larger variations in the relative humidity of the surrounding ambient air, and without introducing side effects such as a frictional resistance to the motion of force responsive elements or a long waiting period before the humidity control system is operational, or sensitivity to atmosphere pressure change.

Another principal object is to provide a humidity control system with the foregoing advantages which is cost effective and compatible with transducers and signal processing circuitry of all types, including circuits which produce a frequency signal output.

Still another object is to provide a humidity control system with the foregoing advantages which will work even at condensation conditions.

A further object is to provide a humidity control system with the foregoing advantages that changes its steady state operating conditions very gradually (a long "time constant") and therefore does not require frequent recalibration.

A still further advantage is to provide a humidity control system with the foregoing advantages which controls humidity for all internal components of the scale, and which can be readily retrofit to existing scales.

SUMMARY OF THE INVENTION

A scale with a housing deferring an interior cavity has a mechanical partial seal that restricts the flow of moisture to the cavity. A force transducer, particularly a variable gap, capacitive-type transducer that converts a force-to-be-measured into an electrical output signal that corresponds to the force, is mounted within the cavity. The cavity also holds a supply of a desiccant. The desiccant is one which both absorbs and desorbs moisture from and to the air in the cavity, thus acting in a manner analogous to that of an electrical capacitor.

The mechanical partial seal, acting in a manner analogous to that of an electrical resistor, is located at an opening in the housing for a shaft that supports a weighing pan external to the housing. The shaft transmits forces applied to the pan by objects to be weighed or counted to the transducer. In a low motion form, the mechanical partial seal is a face seal, preferably one between a portion of the housing and a closely spaced apart plate. The spacing is preferably in the range of 4 to 10 mils. For large motions or low capacity scales, the seal is preferably a radial seal between the shaft and a surrounding sleeve that has a small annular clearance between itself and the shaft so there is no mechanical interaction between the shaft and the sleeve during operation. The clearance is preferably 10 to 20 mils. Air is the lubricating fluid between the components of the seal. The size of the seal passages is designed to produce a resistance R to moisture flow therethroughsuch that, in combination with the moisture "capacitance" C of the dessicant, internal relative humidity as a function of time has a long "time constant" (RC), preferably on the order of five years or longer, and is substantially insensitive to transient or long-term variations in the ambient air temperature or relative humidity. (The use of the term "time constant" here means the period of time for the internal relative humidity within the scale reaches to 63% of the desiccant absorption capacity, when the external relative humidity stays at 100%. In an electrical circuit, where a resistor and capacitor are connected in series, the time constant is the period of time for the capacitor to charge to about 63% of its final voltage value.) Specifically, the values for R and C should yield variations in the internal relative humidity of ±5% for variations in the ambient air relative humidity of 5% to 100%. In the preferred form the desiccant is silica gel, and for high accuracy scales of conventional size, has a mass of 50g to 100g. These and other features and advantages of the present invention will be more fully understood from the following detailed description, which should be read in light of the accompanying drawings.

DETAILED DESCRIPTION OF THE PREFERRED EMBODIMENTS

Figure 1:
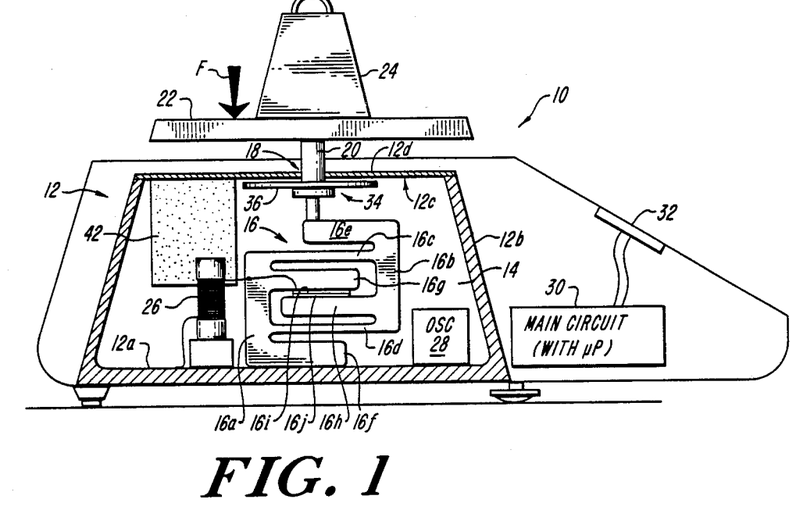
FIG. 1 is a view in vertical section of a variable capacitance-type scale utilizing a humidity control system according to the present invention.
Figure 2:
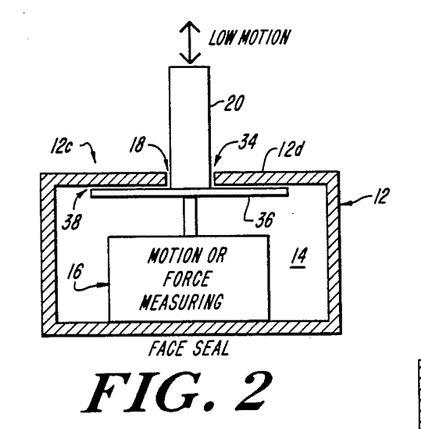
FIG. 2 is a highly simplified schematic view in vertical section of the face seal type of mechanical partial seal shown in FIG. 1.

FIG. 1 shows a high accuracy scale 10 having a housing 12 that defines an interior cavity 14. The scale can be of the type described in detail in U.S. Pat. Nos. 4,382,479 and 4,513,831. A variable capacitance force transducer 16, preferably of the type described and disclosed in U.S. Pat. Nos. 4,448,085 or 4,558,600 and mounted on a floor 12a of the housing within the cavity 14. The side walls 12b of the housing support are sealed to a housing cover 12c. This is preferably a flat plate with a central opening 18 that receives a rigid shaft 20 with an annular clearance between the shaft and the cover 12c (FIG. 2). The upper end of the shaft supports a pan 22 which receives an object 24 to be weighed.

The transducer, as shown, is preferably a monolithic piece of ceramic or quartz that includes a pair of force summing members 16a, 16b, a pair of flexure beams 16c, 16d which together with the force summing members define a parallelogram structure, force input arms 16e, 16f, sensor members 16g, 16h each projecting laterally from associated ones of said force summing members, and electrodes 16i and 16j mounted in opposed, mutually spaced relationship on opposite faces of the sensor members 16g, 16h. Placing a mass 24 on the pan 22 produces a force F that is transmitted by the shaft 20 to the upper force input arm 16e. (While the force arrow F in FIG. 1 is shown displaced to the left of the object 24 it will be understood that the force is the force of gravity acting at the center of mass of the object.) This causes the right hand force summing member 16b, as shown, to deflect downwardly a distance d, resisted by the elastic force of the flexure beams 16c, 16d, as they undergo a generally S-shaped deformation because the left hand force summing member 16a is fixed. This deflection produces a corresponding change $\Delta g$ in the gap g between the electrodes 16i, 16j. This gap change $\Delta g$ corresponds to, and is a measure of, the applied force F.

In the preferred form shown in Figs. 1 and 2, the cavity 14 also holds an inductor 26 having a closely controlled and well defined inductance, which is connected electrically to the variable capacitance gap g to product an LC oscillator, which together with its associated circuitry 28 produces an electrical frequency signal output which is processed by the main circuitry 30 to produce a digital readout of the weight of the object 24 at a display 32. In other forms, the electrical output signal may be a voltage or current signal, as opposed to a frequency signal. Further, the humidity control system of the present invention can be used in combination with the "dummy" capacitor arrangement described in the commonly assigned U.S. Pat. No. 4,649,759 to produce a more stable output signal than can be achieved by the dummy capacitor or the present invention acting lone.

A principal feature of the present invention is a mechanical partial seal 34 which restricts the flow of moisture through the opening 18 between the cavity 14 and the ambient air surrounding the scale. In a low motion form shown in Figs. 1 and 2, the seal 34 is a face seal formed by a plate 36 secured to the shaft 20 at the opening 18 and extending in a generally parallel, mutually spaced relationship with the adjacent portion 12d of the housing cover 12c. The gap 38 between the plate 36 and the housing portion 12d is in the range of 4 to 10 mils with no force applied to the pan 22. For this low motion seal, the maximum travel of the plate under full loading is typically about 0.004 inch. The gap 38 preferably has a value in the range of 6–8 mils for a plate diameter of 1.5 to 2.0 inches. The plate should be mounted with a sufficient vertical spacing at the gap 38 that there is no mechanical interaction between the plate and the housing, even if the object 24 is placed off center on the pan 22 and thereby produces a tilting of the shaft 22 from its normal vertical orientation. On the other hand, the gap spacing should be sufficiently small, and extend over a sufficient radial distance from the opening, that it produces the desired resistance to the flow of moisture through the gap.

Figure 3:
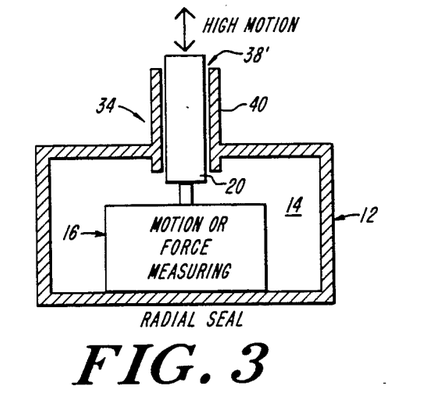
FIG. 3 is a highly simplified schematic view in vertical section corresponding to FIG. 2 showing a radial seal for high motion or low capacity scale applications.

In a high motion form, shown in a simplified manner in FIG. 3, the mechanical partial seal 34 is a radial seal between the shaft 20 and a surrounding sleeve 40 which together define an annular air gap 38'. The radial seal allows a much larger degree of vertical movement of the shaft 22 along its longitudinal axis than the face seal of Figs. 1 and 2. A typical maximum travel for the shaft in the high motion embodiment is 0.25 inch. The dimensions of the gap 38' are preferably uniform and have a value in the range of 10 to 15 mils for a shaft diameter of 0.300 inch and a sleeve length of 1.0 inch and 10 to 20 mils for a shaft diameter of 0.1 to 0.15 inch, also with a 1.0 inch sleeve length. Again, as with the face seal, the gap should be sufficiently large to avoid a mechanical interaction, e.g. the shaft contacting the sleeve if the pan is subjected to an off-center load. On the other hand, it should be sufficiently small, in combination with the height of the gap, to produce the desired resistance to an air flow through the gap 38'.

Another advantage of the radial seal form is the insensitivity to the high frequency barometric pressure change. Because the diameter of the shaft 20 is much smaller than the plate 36, the pressure effect is also much smaller. This is important for low force, high accuracy measurement.

Figure 7:
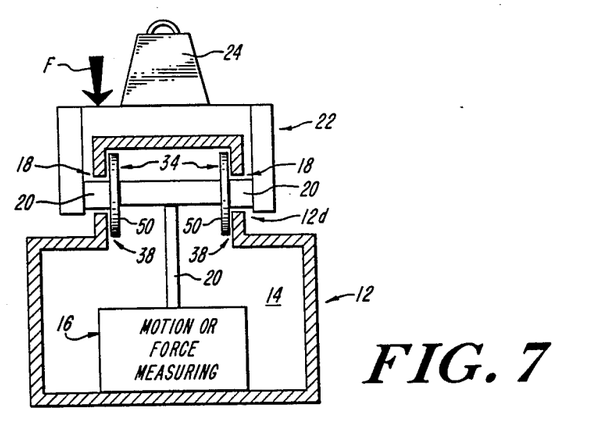
FIG. 7 is a highly simplified schematic view corresponding to Figs. 2 and 3 showing an alternative embodiment for the mechanical partial seal.

In yet another low motion embodiment shown in FIG. 7, the mechanical partial seal 34 is an face seal at a gap 38 between a seal plate so mounted within a closely surrounding portion 12d of the housing having openings 18 open to the atmosphere. The plates 50 are flat discs similar to the plate 36 shown and described with respect to the FIG. 2 embodiment. The pan 22 is coupled to the plate 50 by shafts 20, and the plates are then directly coupled to the force transducer 16. The gap 38 is sufficiently small to provide the operational features described with respect to the seal 34 in Figs. 1–3. The FIG. 7 embodiment can be viewed as an orthogonal face seal type, similar to the structure shown in FIG. 2, where the seal plates 50 of FIG. 7 are oriented 9020 from the orientation of the seal plate 36 of FIG. 2. The FIG. 7 arrangement is useful for low force applications where it is desirable to control the effect from high frequency pressure waves in the air that are normally present. Because the effective force due to the high frequency pressure waves acting on the seal face is perpendicular to the direction of the load force applied, these high frequency pressure effects do not affect the output signal to any significant degree.

Another principal feature of this invention is a supply 42 of a desiccant which both absorbs and desorbs water vapor. A preferred material is silica gel Because this desiccant both collects and releases water vapor, it acts in a manner analogous to that of an electrical capacitor. For a cavity having an interior volume of approximately 100 in$^3$, 100g of silica gel has been found to produce excellent control over the relative humidity within the cavity 14 when used in combination with the mechanical partial seal 34 to resist the free flow of ambient air to and from the cavity and also the moisture diffusion. However, good results are also obtained with silica gel supplies of 50g to 100g, when used in comparable interior volumes and in combination with the partial mechanical seals of the present invention. More specifically, applicant has been able to control the relative humidity within the cavity 14 to within ±5% of a base line value (the steady state humidity in the scale if the external humidity is constant), despite variations in the relative humidity of the ambient air over the range of 5% to 100%. The control system of the present invention has been able to operate effectively under the condensation conditions associated with very high relative humidities. In all of these operations, the supply of desiccant, because it both absorbs and desorbs, has not required replacement. Nor is there any "warm-up" period during which the control system must operate before it is ready to provide the desired degree of humidity control, as is the case with a prior art cooler located within the scale.

Figure 4A:
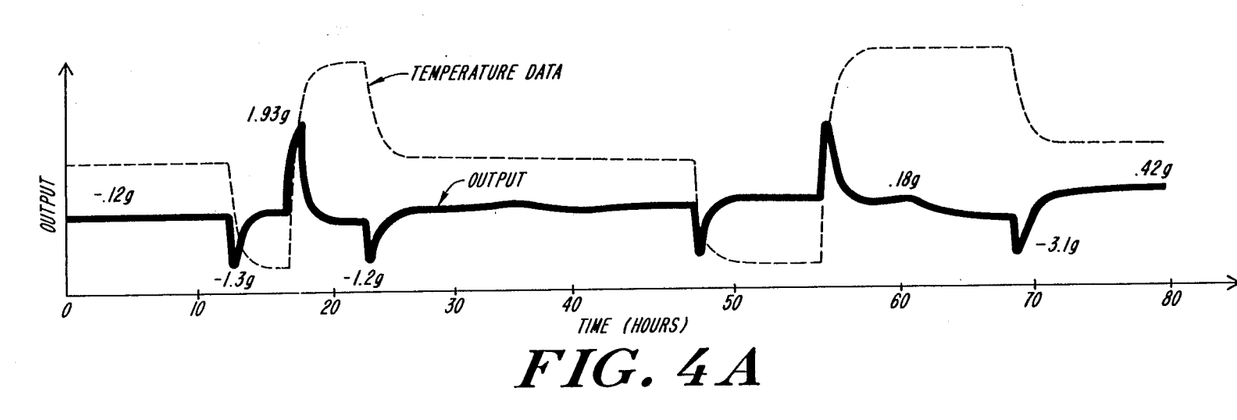
FIG. 4A is a graph showing variations over time in the output signal (expressed in grams) of a scale using this invention and variations in the interior air temperature over the same time period.
Figure 4B:
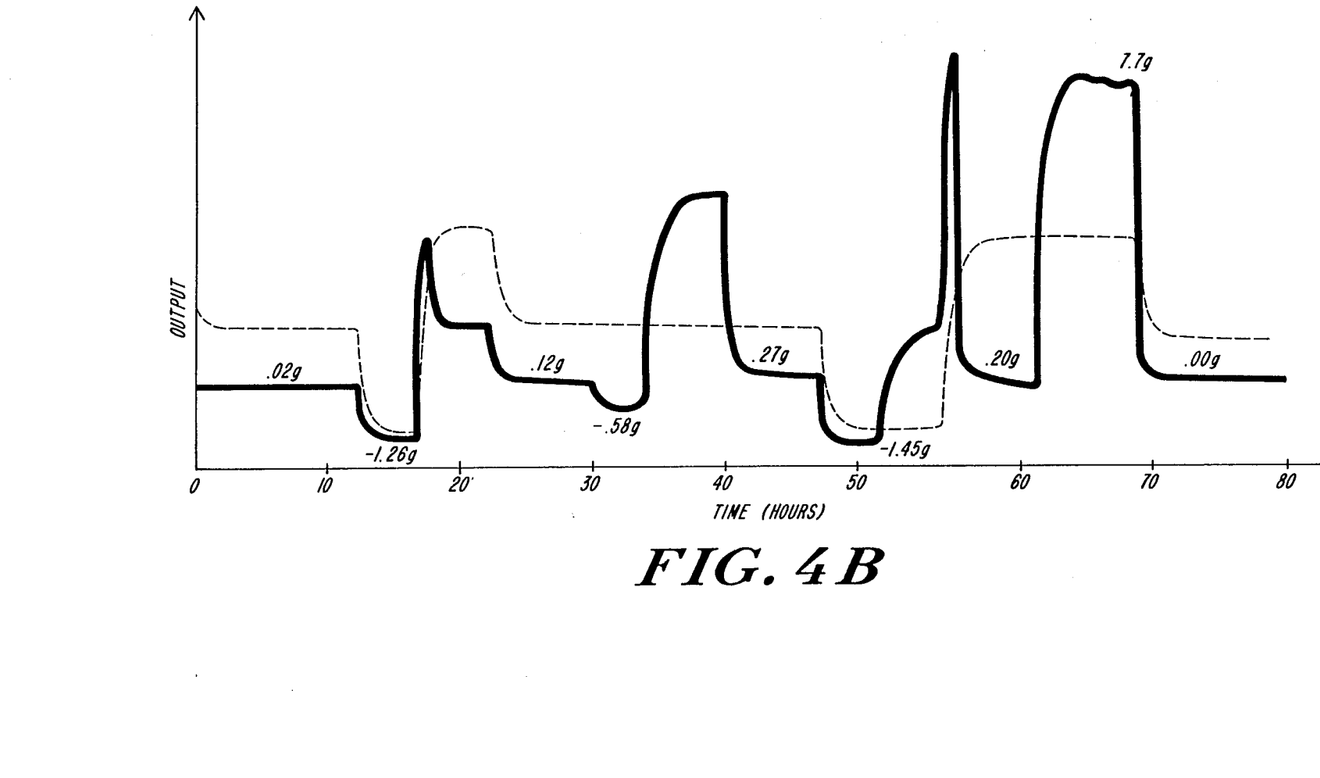
FIG. 4B is a corresponding graph for the same time period showing variations in the output signal for the same scale not using the present invention.
Figure 4C:
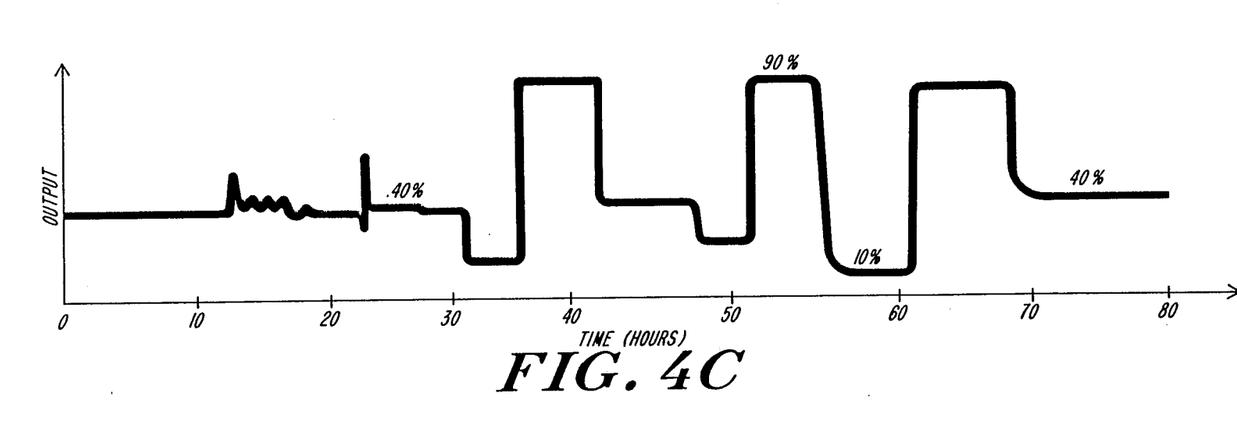
FIG. 4C is a corresponding graph for the same time period showing variations in the ambient air (external) humidity over the same time period.

Figs. 4A–4C are graphs demonstrating a typical operation of the invention over a period of 40 hours, during which the relative humidity of the air external to the scale 10 fluctuated, as shown, between about 10% and 90%. The scale used was a Model 2000 (2000g full scale capacity) high accuracy, capacitive-type scale manufactured by Setra Systems, Inc., but modified to produce the results shown in FIG. 4A to include the desiccant supply 42 and the mechanical partial seal 34 of the face seal type. The internal cavity had a volume of approximately 100 in$^3$. As shown in FIG. 4A, the electrical signal output at any stable temperature between 40° F. to 110° F. (expressed as a weight reading in grams) was controlled to stay within the range of −0.31g to +0.42g. Without the present invention, as shown in FIG. 4B, the output reading under the same conditions varied from −1.45g to +7.7g.

While over a period of days, or even weeks, the base point about which the relative humidity within the cavity varies is substantially constant, there is a very gradual change in the average value of the interior relative humidity. This gradual change occurs over a period of years and corresponds generally to the "time constant" T where T=RC, R is the value of the resistance to moisture flow provided by the partial seal 34, and C is the value of the capacitance provided by the desiccant supply 42. Therefore, an adjustment in the resistance presented by the seal 34 or the "capacitance" for water vapor provided by the desiccant supply 42 will adjust the time constant to an appropriate value, e.g. five years. This long time constant is significant in that it ensures that over shorter time periods, such as several months, the shift in the baseline or average humidity is very small. As a result, there is no need to recalibrate the scale frequently to adjust for changes in environmental conditions.

Figure 6A:
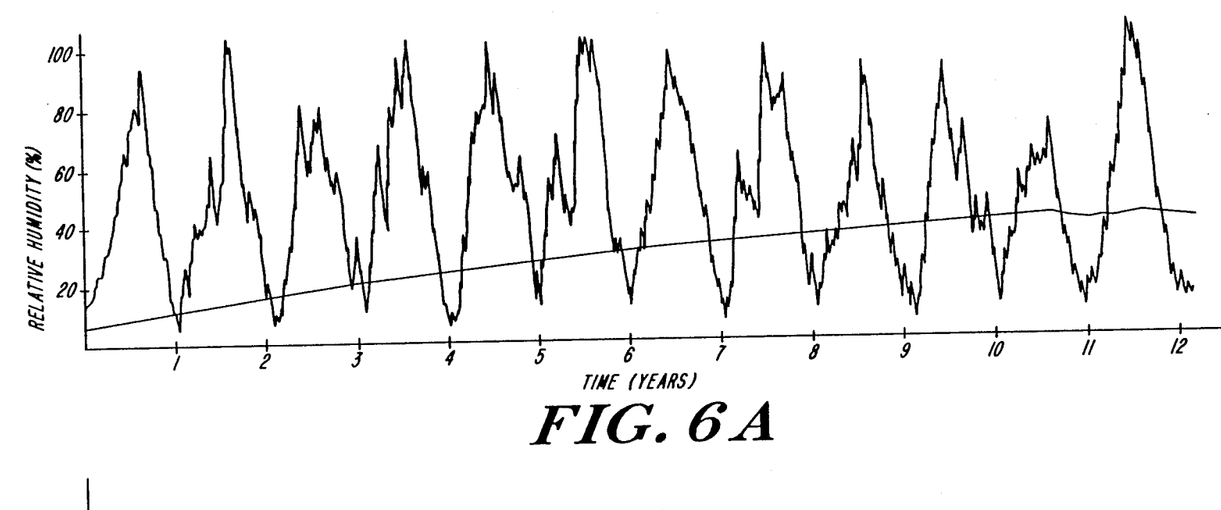
FIG. 6A is a graph showing the expected typical variations of the interior and exterior relative humidities over a period of years.
Figure 6B:
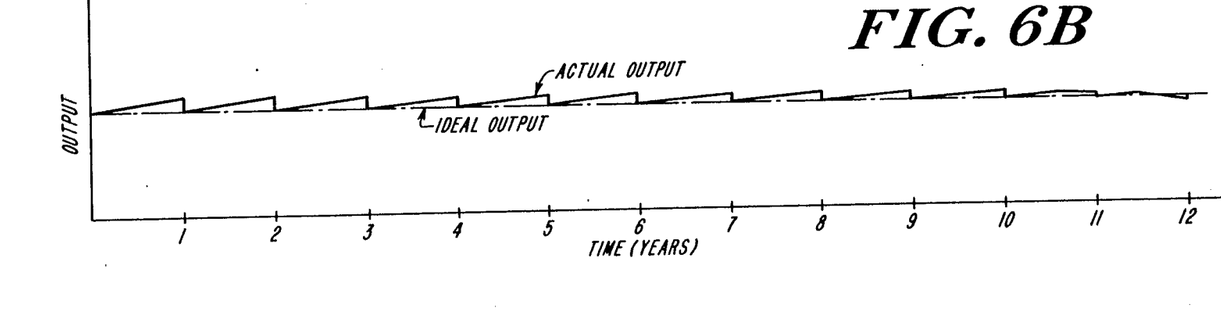
FIG. 6B a graph for the time period corresponding to FIG. 6A showing the anticipated signal output of a scale utilizing the present invention which is recalibrated once a year.

Figs. 6A and 6B demonstrate the operation of the present invention over a period of many years where, as shown in FIG. 6A, the external environmental humidity varies each year from a value near 0% to a value at or near 100%. Plotted on the same graph in FIG. 6A is the internal relative humidity within the scale cavity 14 over the same time period. As can be readily seen, the internal relative humidity undergoes a very gradual, but a steady increase from a few percent to approximately 40% over the first ten years of operation, and thereafter remains generally constant at approximately the 40% relative humidity level. This graph represents the baseline relative humidity for the internal scale humidity. FIG. 6B shows the output signal of the scale 10 utilizing the present invention for the same time period. As shown by the generally sawtooth graph of the actual output, the output signal for each of the first ten years increases monotonically throughout the year reflecting the corresponding gradual increase in the internal humidity within the scale cavity 14. At the end of each year, the scale is recalibrated so that the output returns to the correct point. While recalibration performed as infrequently as once a year is possible with the present invention, it is recommended that the scale 10 be recalibrated at least every six months to produce output readings that are of extremely high accuracy.

Further, applicant has conducted yet other tests comparing the performance of a standard scale (without the mechanical partial seal 34 and the desiccant supply 42) of the type shown in FIG. 1 with a scale protected with a humidity control system of the present invention. The data is given below with the changes in the output values induced by the external humidity change expressed as parts per million (ppm):

| Temperature | Humidity Change | Untreated Scale | Treated Scale (new) | 5 Years Later | 10 Years Later |
| --- | --- | --- | --- | --- | --- |
| 75° F. | 15% to 88% | 2085 ppm | −28 ppm | −20 ppm | −18 ppm |
| 40° F. | 23% to 89% | 1540 ppm | 2 ppm | 4 ppm | 6 ppm |
| 110° F. | 9% to 84% | 3800 ppm | −110 ppm | −98 ppm | −102 ppm |

The five and ten year figures extrapolate from one year of data and assume similar operating conditions, e.g. no continuous 100% humidity. Depending on the temperature, the present invention provides an improvement in the humidity response that is 30 to 200 times better than those in an identical scale not using the present invention.

Figure 5:
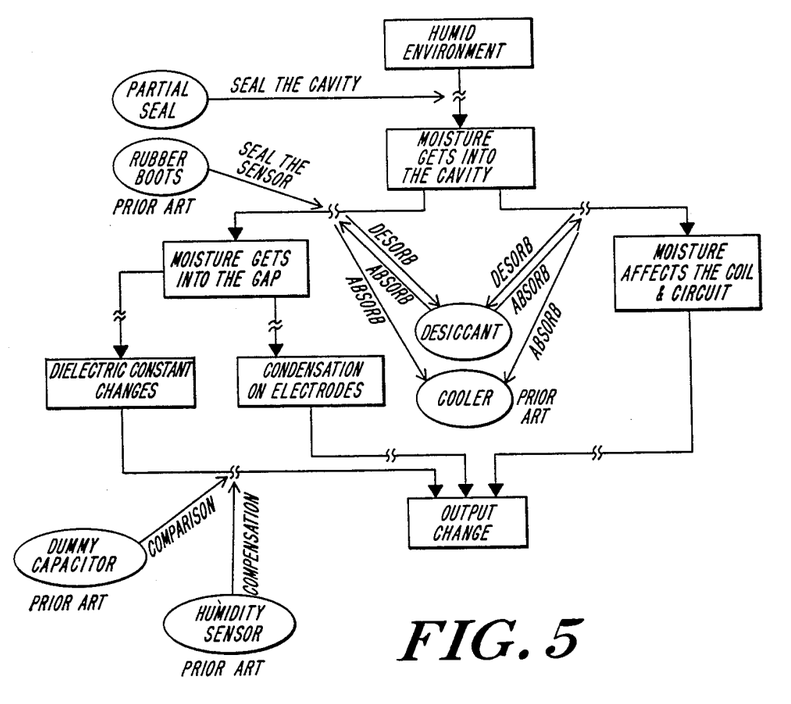
FIG. 5 is an operational flow chart illustrating how changes in the ambient air humidity produce errors in the output signal, and showing prior art attempts to control the humidity effects on output as compared to the present invention.

FIG. 5 illustrates in flow-chart form the mechanisms by which changes in the environmental humidity external to the scale can change the output signal of the scale providing a measurement of the weight or count of the object or objects 24. As evident from FIG. 5, the four prior art approaches illustrated each attempt to control the humidity fluctuations after allowing the external air to enter the interior cavity of the scale. The rubber boot solution attempts to seal the sensor (transducer) before the moisture can influence the variable capacitance gap of the transducer 16. The dummy capacitor and humidity sensor solutions allow the external air to enter the variable capacitance gap, but then generate reference or compensating signal which is used to adjust the net output signal in a manner that neutralizes the changes in the environmental humidity. The present invention is the only humidity control system known to applicant which utilizes any control on the flow of air into the cavity, as reflected by the partial seal at the top left of FIG. 5, and then controls the humidity level of the air supply within the cavity with a desiccant that both absorbs and desorbs water vapor from the air. As is also evident from FIG. 5, the present invention is, like the internal cooler, a humidity control system which addresses the problem of condensation on the electrodes and the effect of fluctuations in water vapor within the cavity on other internal components of the scale such as an inductance coil and circuitry, as reflected by the central and right hand paths of interaction leading to the "output change" block at the bottom of FIG. 5. The only prior art solution which addressed these problems was the internal cooler, but it has disadvantages noted above such as a "warm up" time and additional cost.

There has been described a humidity control system for a high accuracy scale, particularly one operating with a variable capacitance transducer, where the scale is substantially insensitive to variations in the environmental humidity and requires comparatively infrequent recalibration. The humidity control system of the present invention also can operate with a scale having a transducer to produce any output signal including a frequency output signal, can operate at condensation conditions, has no waiting or warm-up period, and is highly reliable. The control system which has been described is also comparatively simple, utilizes known technology, has a comparatively low cost, and can be easily retrofit to existing scales, including scales which utilize other environmental compensation systems such as the dummy capacitor arrangement described in the aforementioned U.S. Pat. No. 4,649,759.

While the present invention has been described with respect to its preferred embodiments it will be understood that various modifications and alterations will occur to those skilled in the art after reading the foregoing detailed description in light of the accompanying drawings. For example, while applicant has described three forms of a mechanical partial seal to restrict the flow of air into the cavity 14, other forms of seals can be used. For example, a labyrinth seal could be formed between the shaft 20 and the adjacent portion of the housing 12. However, more complex seals of this type are more costly to manufacture and are more difficult to mount and align. They therefore increase the cost of the scale. Also, while the invention has been described with respect to a single shaft 20 extending between the pan 22 and the transducer, it will be understood that the pan can be supported by multiple shafts, or their mechanical equivalents. Therefore, while the appended claims refer to "a rigid member" coupling the pan to the transducer, this should be interpreted to include plural rigid members, each with associated partial mechanical seals, and a rigid member or members other than the shaft 20 discussed and illustrated herein. These and other variations and modifications are intended to be included within the scope of the appended claims.

What is claimed is:

1. Apparatus for controlling the humidity within a scale despite variations of the humidity of the ambient air surrounding the scale where the scale has a transducer, particularly a variable gap capacitive transducer, that converts a force to be-measured external to the scale into an electrical output signal corresponding to that force, the force being transmitted to the transducer by a rigid member, comprising a housing having an interior cavity with the transducer mounted within the cavity, said cavity being enclosed and sealed against the ambient except for an opening around said rigid member, a mechanical partial seal of said cavity at said opening which produces a resistance to the flow of air between the exterior and the interior of said housing without a mechanical interaction with said rigid member that would degrade the performance of the scale, and a supply of desiccant located within the cavity, said desiccant being of the type which both absorbs and desorbs moisture from the air.

2. The apparatus of claim 1 wherein said mechanical partial seal comprises a face seal between a plate mounted on said rigid member adjacent said opening and the opposed, spaced apart portion of said housing.

3. The apparatus of claim 2 wherein said plate is parallel to the force-to-be-measured.

4. The apparatus of claim 2 wherein said plate is orthogonal to the force-to-be-measured.

5. The apparatus of claim 4 wherein said face seal spacing is in the range of 4 to 10 mils.

6. The apparatus of claim 1 wherein rigid said member is elongated and wherein said mechanical partial seal comprises a radial seal between said rigid member and a surrounding sleeve.

7. The apparatus of claim 3 wherein said radial seal spacing is in the range of 10 to 20 mils.

8. The apparatus of claim 1 wherein said desiccant is silica gel.

9. The apparatus of claim 8 wherein said desiccant has a mass of 50g to 100g.

* * * * *